Patented Nov. 24, 1931

1,833,021

UNITED STATES PATENT OFFICE

LOUIS H. HOWLAND, OF PASSAIC, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing.  Application filed June 22, 1929. Serial No. 373,072.

This invention relates to the treatment of rubber and similar vulcanizable materials, more particularly to a process of retarding deterioration of the same by treatment with meso-substituted acridines. The invention also relates to the product of such treatment.

It is an aim of this invention to provide a new class of chemicals for retarding the deterioration of rubber. The chemicals included within the scope of this invention comprise the products obtained by the reaction, in the presence of a dehydrating agent, of a carboxylic acid with a diaryl amine in each of whose aryl radicals at least one of the carbon atoms ortho to the nitrogen is bound to hydrogen.

The chemicals may be more graphically described as the products obtained by the reaction, in the presence of a dehydrating agent, of a secondary aromatic amine having the general formula R'—NH—R'', with an acid having the general formula R—COOH, in which R may be any organic radical and R' and R'' are aromatic residues which may be either monocyclic or polycyclic in structure, and in each of which at least one of the carbon atoms, ortho to the nitrogen, is bound to hydrogen. Another way of representing the above described reaction is as follows:

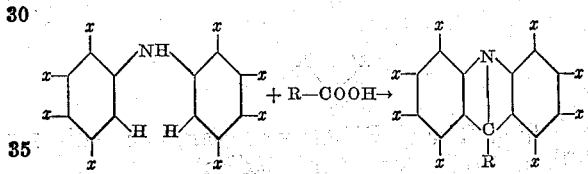

in which R represents any organic radical and $x$ represents hydrogen or any other substituent; furthermore, two adjacent $x$'s may be joined together to form a cyclic structure. R of the acid may be any substituted or unsubstituted alkyl, aryl or aralkyl radical, which may contain in addition any substituent such as for example, a carboxyl group. In this latter case a product may be obtained containing two acridine groups linked by a hydrocarbon residue.

The products obtained comprise the class of chemicals commonly known as meso-substituted acridines, having the general formula:

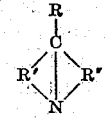

in which R' and R'' are ortho-arylene radicals, and R is any organic radical.

In accordance with the above described reactions, it follows that from each compound represented by R'—NH—R'' may be derived a whole series of products, by choosing different acids, thereby varying the nature of the group represented in the formula by R. Thus by starting with diphenyl amine, a series of compounds may be prepared which may be represented by the formula:—

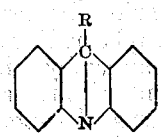

in which R may be, for example, methyl, n-propyl, iso-propyl, pentadecyl, heptadecyl, phenyl or ortho-hydroxy phenyl. This series of products may be obtained by condensing diphenyl amine under the conditions described below with acetic acid, butyric acid, iso-butyric acid, palmitic acid, stearic acid, phenyl-acetic acid, or salicylic acid respectively. In place of the acids mentioned, any other carboxylic acid may be used or the anhydride of any of these acids or the corresponding acid chlorides may be used in place of the free acid. The product obtained from the reaction of diphenyl amine and acetic acid is known as methyl acridine, the other members of the series are named in an analogous manner.

Similarly a series of products may be obtained by substituting for the diphenyl amine in the above reaction, any other di-aryl amine of the kind described, such as, for example phenyl-alpha-naphthylamine, phenyl-beta-naphthylamine or a dinaphthylamine. If a phenyl-naphthyl-amine is used as the starting material, the resulting products are called naphth-benzacridines. If a di-naphthyl-amine is used as the starting material, the products are called naphthacridines. Broadly speaking, all the products described above are known generically as acridines.

The following procedures describe the preparation of and use in rubber, of methyl-acridine and are to be understood as being merely illustrative and not limiting of the invention:

A mixture of 50 grams of diphenylamine, 65 grams of zinc chloride and 31.5 grams of glacial acetic acid is maintained for 14 hours at a temperature of 220–230° C. Escaping vapors may be returned to the mixture by means of a reflux condenser, or the reaction may be carried out in an autoclave. The resulting product is extracted twice with boiling aqueous sodium hydroxide in order to remove the zinc chloride. The oil is separated from the aqueous layer and is then treated with a solution of ammonium chloride to convert the residual sodium hydroxide into sodium chloride. The material is extracted with boiling water until free of inorganic salts. The material is then dried in a vacuum desiccator and is ready for use. In place of the zinc chloride, calcium chloride may be employed, and the amounts of acetic acid used may be varied. Also, acetic anhydride may be employed in place of acetic acid.

In place of the procedure described, any other method of obtaining meso-substituted acridines may be employed, for instance the acyl derivatives of diaryl amines may be used directly for preparing the acridines.

1.5 parts of methyl acridine are incorporated in the usual manner by mixing on a rubber mill in a standard tire tread compound containing 100 parts of rubber. A mixture of diphenyl guanidine and hexamethylene-tetramine is used as the accelerator. This mix, A, is vulcanized in a mold for 60 minutes and for 75 minutes at a temperature corresponding to a steam pressure of 45 pounds per square inch. A similar mix, B, is made from which the methyl acridine has been omitted. This mix is vulcanized under the same conditions. The resulting stocks are aged in the oxygen bomb for 168 hours at a pressure of 300 pounds per square inch and at a temperature of 60° C. The tensiles obtained before and after ageing are given below:

| Green tensiles | A | B |
|---|---|---|
| 60' at 45#  | 4375 | 4020 |
| 75' at 45#  | 4330 | 4100 |
| Aged 168 hours in oxygen | | |
| 60' at 45# | 3085 | 1710 |
| 75' at 45# | 3105 | 1765 |

Good results have also been obtained by the use of the following chemicals: di-acridyl-ethane, normal-propyl acridine, iso-propylacridine, pentadecylacridine, heptadecylacridine, benzylacridine, phenylacridine, ortho-hydroxy-phenyl acridine, beta-hydroxy-napthyl acridine.

These chemicals may be added to rubber by any of the methods known in the art, for example, they may be added to the rubber mix on the mill or they may be applied to the rubber after vulcanization by dipping, painting, spraying, or in other ways. Or they may be mixed with rubber latex or dissolved in a suitable solvent and added to the latex in this way, or added to latex in the form of an emulsion.

The use of this class of chemicals for retarding the deterioration of rubber is, of course, not limited to the type of stock described in the example given. Any of the usual ingredients of a rubber mix may be varied at will and any other accelerators than those mentioned in the axample given may be used.

The chemicals disclosed may be used to retard the deterioration of inner tubes, tires, thread, hose, dipped goods, mechanical goods, latex or articles made from latex, etc.

The term "rubber" in the claims is to be understood as meaning rubber, gutta percha, balata, synthetic rubber or artificial rubber, in any form. Also with the detailed disclosure above given, it is obvious that modifications will suggest themselves, and it is not desired to limit the invention otherwise than as set forth in the appended claims.

Having thus described my invention, what I claim and desire to protect by Letters Patent is:

1. A method of retarding the deterioration of rubber which comprises treating rubber with a meso-substituted acridine.

2. A method of retarding the deterioration of rubber which comprises treating rubber with a compound having the general formula

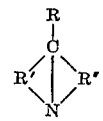

in which R' and R'' are ortho-arylene radicals, and R is any organic radical.

3. A method of retarding the deterioration of rubber which comprises treating rubber with a compound having the general formula

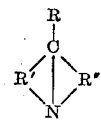

in which R' and R'' are ortho-arylene radicals, and R is any unsubstituted or substituted organic residue, including one containing an additional meso-substituted acridine.

4. A method of retarding the deterioration of rubber which comprises treating rubber with a compound having the general formula

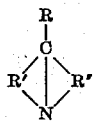

in which R' and R" are ortho-arylene radicals, and R may be any substituted or unsubstituted alkyl, aryl or aralkyl radical.

5. A method of retarding the deterioration of rubber which comprises treating rubber with a compound having the general formula

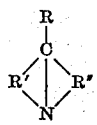

in which R' and R" are ortho-arylene radicals, and R may be any substituted or unsubstituted alkyl radical.

6. A method of retarding the deterioration of rubber which comprises treating rubber with methyl acridine.

7. Rubber derived from rubber containing a meso-substituted acridine.

8. Vulcanized rubber derived from rubber containing a meso-substituted acridine.

9. Rubber derived from rubber containing a compound having the general formula

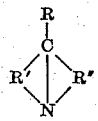

in which R' and R" are ortho-arylene radicals, and R is any organic radical.

10. Rubber derived from rubber containing a compound having the general formula

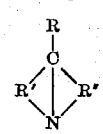

in which R' and R" are ortho-arylene radicals, and R is any unsubstituted or substituted organic residue, including one containing an additional meso-substituted acridine.

11. Vulcanized rubber derived from rubber containing a compound having the general formula

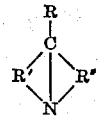

in which R' and R" are ortho-arylene radicals, and R is any organic radical.

12. Rubber derived from rubber containing a compound having the general formula

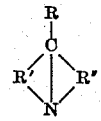

in which R' and R" are ortho-arylene radicals, and R may be any substituted or unsubstituted alkyl, aryl or aralkyl radical.

13. Rubber derived from rubber containing a compound having the general formula

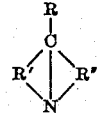

in which R' and R" are ortho-arylene radicals, and R may be any substituted or unsubstituted alkyl radical.

14. Vulcanized rubber derived from rubber containing a compound having the general formula

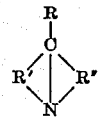

in which R' and R" are ortho-arylene radicals, and R may be any substituted or unsubstituted alkyl, aryl or aralkyl radical.

15. Vulcanized rubber derived from rubber containing a compound having the general formula

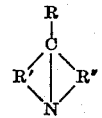

in which R' and R" are ortho-arylene radicals, and R may be any substituted or unsubstituted alkyl radical.

16. Rubber derived from rubber containing methyl acridine.

17. Vulcanized rubber derived from rubber containing methyl acridine.

Signed at Passaic, county of Passaic, State of New Jersey, this 31st day of May, 1929.

LOUIS H. HOWLAND.